US012718056B2

(12) United States Patent
Porter et al.

(10) Patent No.: US 12,718,056 B2
(45) Date of Patent: Aug. 25, 2026

(54) APPARATUS OF A KNOWLEDGE GRAPH TO ENHANCE THE PERFORMANCE AND CONTROLLABILITY OF NEURAL RANKING ENGINES

(71) Applicant: Dialpad UK Limited, London (GB)

(72) Inventors: Tim Porter, Surrey (GB); Michele Sama, Lausanne (CH); Christopher James Pedder, Leysin (CH); Andre Da Palma, London (GB); Ozgun Tandiroglu, London (GB)

(73) Assignee: Dialpad, Inc., San Ramon, CA (US)

( * ) Notice: Subject to any disclaimer, the term of this patent is extended or adjusted under 35 U.S.C. 154(b) by 1134 days.

(21) Appl. No.: 17/762,667

(22) PCT Filed: Jun. 29, 2020

(86) PCT No.: PCT/US2020/040176
§ 371 (c)(1),
(2) Date: Mar. 22, 2022

(87) PCT Pub. No.: WO2020/264518
PCT Pub. Date: Dec. 30, 2020

(65) Prior Publication Data
US 2022/0398432 A1 Dec. 15, 2022

Related U.S. Application Data

(60) Provisional application No. 62/868,202, filed on Jun. 28, 2019.

(51) Int. Cl.
*G06N 20/00* (2019.01)
*G06N 3/042* (2023.01)

(52) U.S. Cl.
CPC .................................... *G06N 3/042* (2023.01)

(58) Field of Classification Search
CPC .... G06N 3/042; G06N 5/022; G06F 16/9032; G06F 16/9027
See application file for complete search history.

(56) References Cited

U.S. PATENT DOCUMENTS

2013/0066921 A1* 3/2013 Mark .................... G06F 16/367 707/794
2015/0169833 A1* 6/2015 Waltinger ............. G16H 50/20 705/2

(Continued)

OTHER PUBLICATIONS

Shtok, Anna, et al. "Predicting query performance by query-drift estimation." ACM Transactions on Information Systems (TOIS) 30.2 (2012): 1-35 (Year: 2012).*

(Continued)

*Primary Examiner* — Andrew T McIntosh
(74) *Attorney, Agent, or Firm* — Patent Law Works, LLP

(57) ABSTRACT

An apparatus allows the semi-automated creation and curation of a knowledge graph based on a query-atom ER ranking engine. This apparatus cooperates with a domain expert to smoothly and semi-automatically incorporate or restructure textual data in the knowledge graph when a suitable high-confidence response to a query cannot be found. The apparatus extends the conventional information retrieval approach to consumer interaction by building a structured knowledge graph. Using graph exploration, the apparatus augments the ranking made by the underlying neural model in order to stay in sync with the constantly-changing domain of application. The apparatus allows for the consistent, cognitive, consumer-driven incorporation and restructuring of relevant unstructured data in a knowledge graph which is generated by mimicking users' behaviors.

14 Claims, 4 Drawing Sheets

100

(56) References Cited

U.S. PATENT DOCUMENTS

| | | | | |
|---|---|---|---|---|
| 2016/0350442 | A1* | 12/2016 | Crosby | G06F 16/2358 |
| 2017/0293690 | A1* | 10/2017 | Malhotra | G06F 16/24578 |
| 2018/0232443 | A1* | 8/2018 | Delgo | G06F 16/35 |
| 2019/0042988 | A1 | 2/2019 | Brown et al. | |
| 2019/0102395 | A1* | 4/2019 | Kshetramade | G06F 16/9535 |
| 2019/0163818 | A1 | 5/2019 | Mittal et al. | |
| 2020/0242485 | A1* | 7/2020 | TeNyenhuis | G06F 16/93 |

OTHER PUBLICATIONS

Zhang, Shiyue, and Mohit Bansal. "Addressing semantic drift in question generation for semi-supervised question answering." Proceedings of the 2019 Conference on Empirical Methods in Natural Language Processing and the 9th International Joint Conference on Natural Language Processing (EMNLP-IJCNLP). (Year: 2019).*

International Search Report and Written Opinion for PCT/US2020/040176 filed Jun. 29, 2020, mailed Nov. 4, 2020, 12 pgs.

Bonatti, P.A. et al. Knowledge Graphs: New Directions for Knowledge Representation on the Semantic Web 'Dagstuhl Seminar 18371 ). In Dagstuhl Reports (vol. 8, No. 9). Schloss Dagstuhl-Leibniz-Zentrum fuer Informatik (pp. 29-111 ). Mar. 25, 2019 [retrieved on Aug. 29, 2020). Retrieved from the Internet: <https://drops.dagstuhl.de/opus/volltexte/2019/10328/pdf/dagrep_v008_i009_p029_18371.pdf>; entire document.

Rong, S. et al. A Machine Learning Approach for Instance Matching Based on Similarity Metrics. In International Semantic Web Conference (pp. 460-475). Springer, Berlin, Heidelberg. Nov. 2012 [retrieved on Aug. 29, 2020]. Retrieved from the Internet: <https://link.springer.com/content/pdf/10.1007 /978-3-642-35176-1_29.pdf>; entire document.

* cited by examiner

100

200

APPARATUS OF A KNOWLEDGE GRAPH TO ENHANCE THE PERFORMANCE AND CONTROLLABILITY OF NEURAL RANKING ENGINES

CROSS REFERENCE TO RELATED APPLICATIONS

This application is a continuation of PCT/US2020/040176, filed on Jun. 29, 2020, and titled "Apparatus of a Knowledge Graph to Enhance the Performance and Controllability of Neural Ranking Engines", which claims priority under 35 U.S.C. § 119 to U.S. Provisional Patent Application No. 62/868,202, filed on Jun. 28, 2019, and titled "Application Of A Self-Maintained Knowledge Graph To Enhance The Performance And Controllability Of Neural Ranking Engines When Operating Outside Of Their Training Domain", each of which are hereby incorporated by reference in their entirety.

FIELD OF THE INVENTION

The systems, apparatus, methods and graphs disclosed herein generally relates to the field of textual information representation and retrieval in computers and data processing systems. In particular, the systems, apparatus, methods and graphs of this disclosure address the area of neural information-retrieval (IR) solutions working in domains outside of the one in which they have been trained.

BACKGROUND

In the field of natural language processing (NLP) and natural language understanding (NLU), much attention has been focused on information matching and retrieval for the purposes of serving information in response to queries. Solutions grounded in rule-based traditional NLP methods have given way to neural network approaches. The introduction of neural network solutions to ranking problems greatly increases their performance as long as their training domain closely approximates the domain of application.

SUMMARY

An object of the systems, apparatus, methods and graphs of this disclosure is to enhance the real-world application of a neural information retrieval (IR) ranking model by increasing its performance, reducing associated costs and making it configurable. The systems, apparatus, methods and graphs combine a neural IR model trained on training data with a knowledge graph (KG) generated from data that the ranking engine should index, and data derived from observing human reactions to given predictions. Firstly, the system structures the entities to be ranked using hierarchical information from the unstructured relevant documents provided to it. This KG is composed of entities (documents) and atoms (sentences) nodes, and with structured edges connecting them and describing their relationship.

The apparatus assumes that the neural IR model will inevitably drop performances over time due to the domain drift problem and employs an adaptive process to compensate that by re-ranking the results by leveraging information on a support KG which has been bootstrapped from the indexed data given to the IR system and which has been "adapted" to align the results according to the feedback it is given. The end user will perceive this as if the apparatus is returning the correct results while underneath the ranking predicted by the IR model is updated by factoring in the desired cognitive behavior that the apparatus has observed so far.

In order to adapt and improve the ranking performance (i.e., capturing cognitive behavior) the system can: 1) ask for explicit approval from a designated domain expert who will be asked to resolve a detected quality issue and/or 2) monitor implicit or explicit signals deriving from telemetries capturing the end users' behaviors. Ultimately both these human-inputs contribute to self-maintaining the KG in a structure which maximizes the ranking performance.

The adaptive process responsible for driving the adaptation of the KG over time focuses on identifying areas of the application domain in which the neural IR model is either incapable of finding any suitable result or for which its confidence is low and therefore multiple suitable candidates exist. For these cases, the adaptive process aims to capture the information necessary to re-align predictions to the application domain (which in practice is constantly changing).

The foregoing has outlined rather broadly the features and technical advantages of the present disclosure in order that the detailed description that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

DETAILED DESCRIPTION

Figure 1:
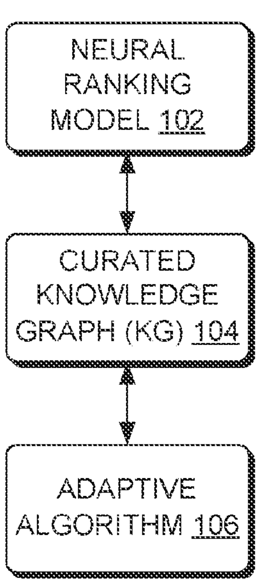
FIG. 1 is a block diagram of an overview of a system to create and maintain a curated knowledge graph (KG) in accordance with an implementation.

The systems, apparatus and processes disclosed herein are applicable to fast-changing ranking problems, where controllability and explainability of predicted search results is important. The system implements a cognitive adaptive solution to these problems, and to serve more "human-like" responses.

When the system disclosed herein is deployed in conventional circumstances, the system overcomes the conventional problems that the information to be served and the queries don't overlap with the training domain. More specifically in regards to the problems of the conventional circumstances, the training domain and application domain diverge ("domain drift") because neural IR solutions are trained on very large, completely or partly human-labelled data sets. These data sets are, in general:

a. Aggregated across multiple domains and therefore the data sets do not belong to a single domain, since they need to be large for training neural networks.
b. Not particularly up-to-date, since collection and collation take time.
c. Human-labelled, and therefore expensive to produce.

As a result, models trained on these data sets do not overlap well with their domain of application, nor are they up-to-date with current developments. Regular model retraining using new domain-specific user-generated data can mitigate these problems to some degree, but still has the significant disadvantages of being costly, slow and likely to cause the forgetting of older, but still domain-relevant information. Additionally, retraining the model on collected but non-curated data also makes the model susceptible to accidental or deliberate data poisoning.

It is a well-known problem of neural networks that the neural networks make confident but inaccurate predictions when operating outside of their training domain. The behavior of neural network solutions cannot be modified on a granular level, in response to individual queries, nor can it be easily explained since they often act as “black boxes”. The system disclosed herein solves the problem of the performance gap for open question answering outside of the domain of expertise of a traditional neural IR model, alongside the problems of controllability and explainability of conventional neural network solutions.

The systems, apparatus, methods and graphs of this disclosure address the problems of neural IR solutions already outlined by creating and maintaining a curated knowledge graph (KG). This extension allows such systems to operate outside of their training domain, and respond to queries for which they may not have the relevant expertise, but for which supplementary information is available, either within unstructured knowledge connected to the system, or through input from a domain expert. In addition, it gives the implementer much more control over the system, and allows them to explain the origin information served in response to queries. It does so without the data-poisoning or catastrophic forgetting risks of continuous model retraining, and reduces costs by reducing the required frequency of model retraining.

The systems, apparatus, methods and graphs of this disclosure make predictions through an adaptive process which applies expertise captured in a KG, The fact that the adaptive process also keeps the KG up to date solves the problem of domain drifting.

Incorporation or restructuring of relevant unstructured data in the KG allows the system to extend its expertise by requesting input from a domain expert allowing it to behave “cognitively” (i.e., in a human-like fashion). The fact that the requested input is in response to very recent queries means that the human-labelling effort is concentrated on those cases that will improve model performance the most, Alterations made by the domain expert are then used in the KG for subsequent searches.

FIG. 1 is a block diagram of an overview of a system 100 to create and maintain a curated knowledge graph (KG). System 100 is composed of three components: (a) a neural ranking model 102 capable of ranking given entities by how well they match with a given query, (b) a structured KG used as a data model 104 and (c) an adaptive process 106 which handles incoming queries and when necessary, updates the KG.

Figure 2:
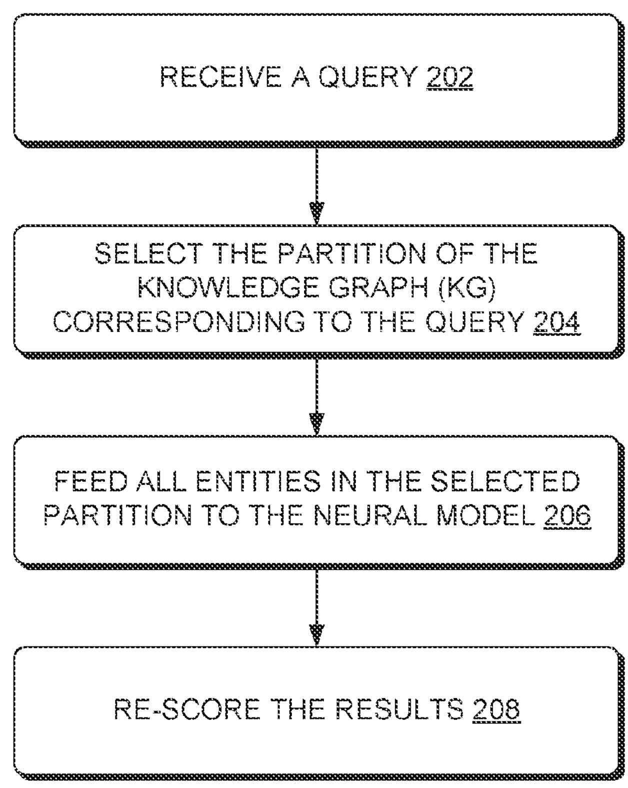
FIG. 2 is a flowchart of a method to create and maintain a curated knowledge graph (KG) in accordance with an implementation.

FIG. 2 is a flowchart of a method 200 to create and maintain a curated knowledge graph (KG), Upon receiving a query at block 202, the adaptive process selects the partition of the KG corresponding to the query at block 204, feeds all entities in the selected partition to the neural model at block 206 and re-scores the results at block 208 according to the shape of the KG itself. The method 200 returns only one result if it is confident, multiple results if the process cannot confidently decide which one will be used, or no results if it is not confident that anything matches. The purpose of the adaptive process is to maintain the KG in a shape which will maximize the number of high confidence results. This adaptation can happen reactively when feedback is given or proactively when the process decides to ask for the explicit approval of a domain expert.

In order to decide how many results to return, the adaptive process re-scores the results according to the graph and then compares the ranked set with three different thresholds, each one of which can be dynamically adjusted over time. The thresholds are: The minimum score, the delta with the best match and the delta with the previous result. The minimum score is used to instantly discard results which appear to be irrelevant to the query. Its numerical value depends on the local density of results in the graph, and in particular on the degree of overlap between entities. The delta with the best match and the delta with the previous result are computed as the difference in score between a result above the minimum threshold and respectively the top result and the previous result in the rank. Their value could be adapted by using measured data in order to achieve the optimal ratio between impressions and click through. More advanced regression models can also be used to generate these thresholds without changing how the system operates. The adaptive process is designed to shape the graph in order to incrementally converge to returning only a single result, i.e., such that the top result will significantly outperform the second-best result.

The structured graph has primarily two types of nodes: entities and atoms. Entities represent results which can be returned to the end user upon receiving a query. Atoms represent the smallest atomic concepts which the neural model is capable of comparing with a query without loss of semantic meaning. The form and size of such atoms depends on the specifics of the neural model. For instance, atoms could be sentences or short paragraphs encoded as dense vectors.

Upon indexing a new entity (for example a given document) the process decides how to split the entity into atoms and then expands the graph by creating a new node of type “Entity” and several new nodes of type “Atom” whilst including all the necessary edges to connect them. From unstructured text Atoms can be extracted by using a sentence splitter. From structured data meaningful textual fields such as titles and descriptions can be used while ignoring the rest. If two entities overlap, (e.g., two copies of the same document) their atoms will be shared. At the end of the indexing process each atom node will be unique in the KG and will have an edge for each entity containing it.

To simultaneously maximize the ranking performance and compensate for domain drift (which would otherwise undermine the run-time performance of the underlying neural model) the system supports the following graph structuring operations.

The system allows the creation of orphaned atom nodes (i.e., an atom node not connected to any entity) in the graph. Upon receiving a query for which the adaptive process is not able to provide any confident result, a new node of atom type can be created to represent such query in the search space. The system can then ask the domain expert to manually connect the orphaned atom to an existing entity or to create a new entity to re-align the graph with the domain of application. Different techniques can be applied to facilitate and limit the amount of manual effort, e.g., orphaned atoms could be clustered together and connected in bulk, but the system could also suggest to which entities they could be connected.

The system allows the creation of new atom nodes connected to an existing entity. Upon serving a low confidence result for which the system could not have identified a single result, the system captures the query for use in expanding the graph. This mechanism can be implemented as either a supervised or an unsupervised process. In the supervised case, a domain expert will be asked to confirm if such atom can be created. If unsupervised click through tracking can be statistically used to connect the atom accordingly to one or more entities. Implementations of the system can choose their own strategy, however, it is worth mentioning that unsupervised updates might suffer from data poisoning.

The system allows atom nodes to be disconnected from an entity. When an atom contributes to returning an undesirable result, the adaptive process can reshape the graph and either associate the atom to a different entity or remove it altogether. As in the previous case, this operation can be done as a supervised or unsupervised process.

The system allows duplication of entity nodes in order to treat them differently Since users' click-through rate is biased by how information is presented in relation to the given query, the system allows customization of the look and feel of certain results to better match the query. Duplicated entity nodes are connected to the original entity, and the adaptive process will decide which one to use according to which atom nodes they are connected to. The adaptive process can proactively decide that a duplicated entity is needed when several atoms connected to a single entity represent an independent sub-cluster for the entity. Conceptually such sub-clusters have their own specific meaning, and so their presentation can be optimized. The generation of improved presentations for an entity node can be supervised by a human by proactively asking a domain expert to phrase it, or can be automated by employing generative networks.

When re-scoring and re-ranking results the adaptive process takes into account the score of the various atoms as well as the number of nodes to which they are connected. The process works as follows: the solution scans through all relevant nodes of entity type. For each one of them the process explores all connected atom nodes and ranks them by using the neural IR model. The process generates a final score for each node by combining all partial scores of its connected atoms. In one embodiment, the final score included: (a) the weighted average of the top two most relevant Atoms, (b) the weighted score of the Atom representing the Entity's title, and (c) the weighted centroid of all the Entity's Atoms. In the case of duplicated entities, the process will favor the more specialized one while keeping the highest score. The system could also work with different node selection approaches.

Figure 3:
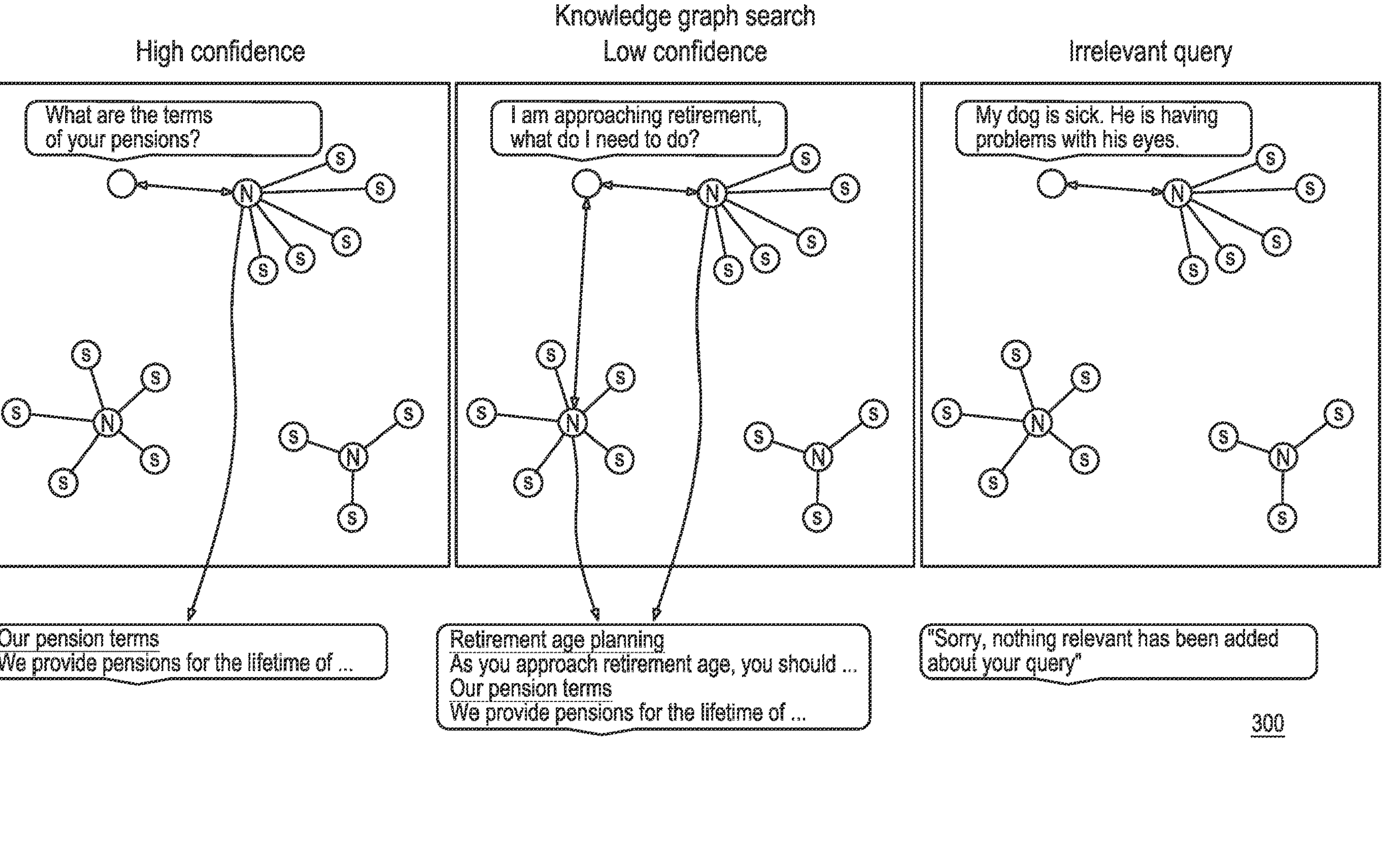
FIG. 3 is a graph to create and maintain a curated knowledge graph (KG) in accordance with an implementation.

FIG. 3 is a graph 300 to create and maintain a curated knowledge graph (KG). Graph 300 shows how the system performs search for the example given in the text. The KG for a financial company contains the atom node "What are your pension terms?" related to an entity node in the graph. A user asks "What are the terms of your pensions?". The neural IR ranking engine compares query-atom similarity, scores it as highly similar with high confidence, which leads to a high query-entity score. The adaptive process then returns the entity as a highly confident result. Assume instead that for the query "I am approaching retirement, what do I need to do?" there would be no highly-ranked atom existing in the KG and also assume that in this case the process would return two entities ranked with low confidence. In this case, the query is captured as an atom node, and later shown to a domain expert with a request to connect the correct node entity. Consider a user asking for information which is not relevant to the domain of application. The query does not match any entity in the KG and no results are returned. The query is then captured as an orphaned atom node and shown to a domain expert who can either (a) update the KG to include the missing information or link information relevant to this new query, or (b) mark the query as irrelevant.

Figure 4:
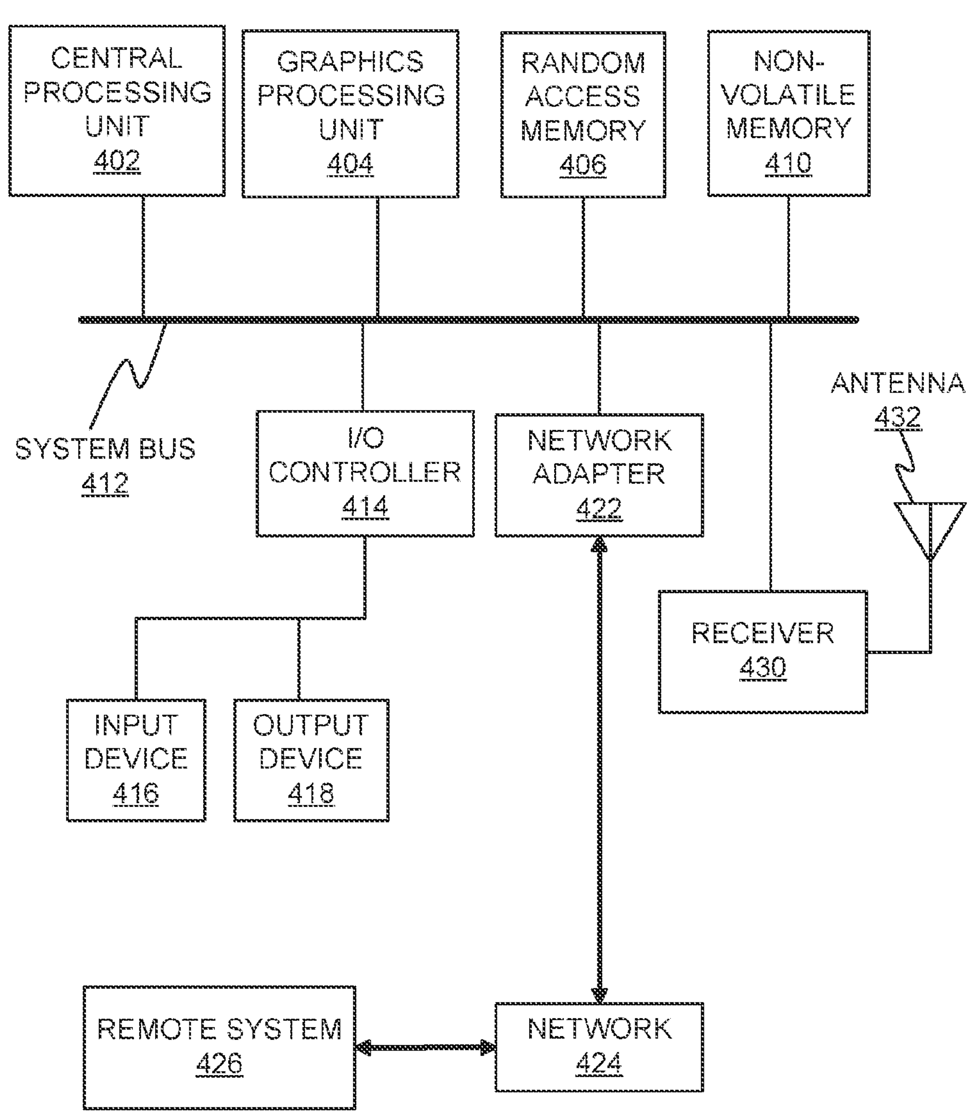
FIG. 4 is a block diagram of an exemplary computer system that is suitable to implement the systems, graph, apparatus and methods disclosed herein.

FIG. 4 is a block diagram of an exemplary computer system 400 that is suitable to implement the systems, graph and methods disclosed herein. System 400 includes one or more of central processing unit 402 having at least one microprocessor. Central processing unit 402 can be coupled directly or indirectly to memory elements through system bus 412. The memory elements comprise non-transitory computer-readable memory capable of storing computer-executable instructions. The memory elements can include random access memory 406 employed during the execution of program code and non-volatile memory 410 for longer term storage of data and instructions. One or more input devices 416 and output devices 418 can be coupled to system bus 412 either directly or through an intervening input/output controller 414. Examples of input device 416 include, but are not limited to, a pointing device, such as a mouse or a trackpad, or a keyboard. Examples of input device 416 can also include a camera and a microphone for recording and transmitting video signals and audio signals. Examples of output device 418 include, but are not limited to, a display screen or a printer. Input device 416 and output device 418 can be combined into a single device comprising a touchscreen comprising a display screen (for displaying information to the user of system 400) having a touch-sensitive surface (for receiving input from the user). System 400 also includes network adapter 422 to enable the system to become coupled to remote system 426 through intervening private or public networks 424. Modems, cable modems, Ethernet cards, and wireless network adapters are just a few of the currently available types of network adapters. System 400 can include one or more receivers 430. Receiver 430 receives wireless signals via antenna 432. Receiver 430 is adapted for receiving a data signal from a transmitting device. Receiver 430 can comprise a transceiver capable of both transmitting and receiving wireless data signals. While various component devices of computer system 400 are shown as separate devices in FIG. 4 for purposes of description, various component devices may be integrated into a single device as is known in the art, such as in a system-on-a-chip (SoC) device. In some implementations, system 400 can be scaled to include a multiplicity of some or all of the components shown in FIG. 4 working together in a system having increased computing power. In some implementations, system 400 can be virtualized as one or more virtual machines instantiated in a cloud computing data center.

Some implementations of the present system can comprise a computer program encoded in a computer-readable memory of system 400. The computer program comprises computer-executable instructions that, when executed, causes the interactive sign language response system to perform the steps of method 200 described herein. System 400 can be embodied in any suitable data processing system or computer system including, but not limited to, personal computers (PC), file servers, cloud computing systems, software-as-a-service (SaaS) systems, cellular telephones, smartphones, tablet devices, laptop computers, personal digital assistants, and the like.

Although the present system and its advantages have been described in detail, it should be understood that various changes, substitutions and alterations may be made herein without departing from the scope of the system as defined by the appended claims. Moreover, the scope of the present application is not intended to be limited to the particular implementations of the process, machine, manufacture, composition of matter, means, methods and steps described in the specification. As one of ordinary skill in the art will readily appreciate from the disclosure of the present system, processes, machines, manufacture, compositions of matter, means, methods or steps, presently existing or later to be developed that perform substantially the same function or achieve substantially the same result as the corresponding implementations described herein may be utilized according to the present system. Accordingly, the appended claims are intended to include within their scope such processes, machines, manufacture, compositions of matter, means, methods, or steps.

Although the operations of some of the disclosed methods are described in a particular, sequential order for convenient presentation, it should be understood that this manner of description encompasses rearrangement, unless a particular ordering is required by specific claim language. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device. Computer-readable storage media are tangible media that can be accessed within a computing environment (one or more optical media discs such as DVD or CD, volatile memory (such as DRAM or SRAM), or nonvolatile memory (such as flash memory or hard drives)).

For clarity, only certain selected aspects of the software-based implementations are described. Other details that are well known in the art are omitted. Likewise, the disclosed technology is not limited to any particular computer or type of hardware. Certain details of suitable computers and hardware are well known and need not be set forth in detail in this disclosure.

What is claimed is:

1. An apparatus comprising:

a microprocessor;

a bus operably coupled to the microprocessor;

a storage medium operably coupled to the microprocessor through the bus and having a trained neural ranking model that ranks entities in reference to match with a query, and an adaptive component which includes program instructions that when executed by the microprocessor receives incoming queries and builds a structured knowledge graph out of relevant unstructured data of the incoming queries and entities of the trained neural ranking model;

the adaptive component further comprising program instructions that when executed updates the structured knowledge graph to incorporate human-curated data into the structured knowledge graph, and having program instructions that when executed traverses the structured knowledge graph to re-score results of the incoming queries to correct for training domain drift; and wherein the structured knowledge graph has entities nodes and atoms nodes, the entities nodes represent results that can be returned to an end user upon receiving the query and the atoms nodes represent the smallest atomic concepts which the trained neural ranking model is capable of comparing with the query without loss of semantic meaning the apparatus permitting creation of orphaned atom nodes not connected to any entity and a human domain expert is used to connect an orphaned atom node to an existing entity or creation of a new entity.

2. The apparatus of claim 1, wherein the storage medium further comprises program instructions that when executed by the microprocessor:

determines a measure of confidence of results of the incoming queries;

determines if a measure of confidence is at or above a predetermined threshold; and if the measure of confidence is not at or above the predetermined threshold, generates and transmits a request for human intervention and updates the structured knowledge graph with a response for the human intervention.

3. The apparatus of claim 1, wherein the storage medium further comprises program instructions that when executed by the microprocessor:

receives a query in reference to the structured knowledge graph; and incorporates domain expert knowledge.

4. The apparatus of claim 1, wherein the storage medium further comprises program instructions that when executed by the microprocessor provides data-driven targeting of efforts of a domain expert in curating the structured knowledge graph based on one or more signals indicative of training domain drift.

5. The apparatus of claim 1, wherein the updates to the structured knowledge graph includes at least one of adding nodes, adding connections between nodes, and removing nodes.

6. The apparatus of claim 1, wherein the adaptive component shapes the structured knowledge graph to return a single result for queries.

7. The apparatus of claim 1, wherein the apparatus compares query-atom similarity and generates a score based on similarity.

8. An apparatus comprising:

a microprocessor;

a bus operably coupled to the microprocessor;

a storage medium operably coupled to the microprocessor through the bus and having a trained neural ranking model that ranks entities in reference to match with a query, and an adaptive component which includes program instructions that when executed by the microprocessor receives incoming queries and builds a structured knowledge graph out of relevant unstructured data of the incoming queries and entities of the trained neural ranking model;

the adaptive component further comprising program instructions that when executed updates the structured knowledge graph to incorporate human-curated data into the structured knowledge graph, and having program instructions that when executed traverses the structured knowledge graph to re-score results of the incoming queries to correct for training domain drift; and wherein the structured knowledge graph has entities nodes and atoms nodes, the entities nodes represent results that can be returned to an end user upon receiving the query and the atoms nodes represent the smallest atomic concepts which the neural ranking model is capable of comparing with a query without loss of semantic meaning, wherein in response to an atom contributing to returning an undesirable result, the adaption component reshaping the structured knowledge graph to either associate the atom to a different entity or remove it.

9. The apparatus of claim 8, wherein the apparatus compares query-atom similarity and generates a score based on similarity.

10. The apparatus of claim 8, wherein the storage medium further comprises program instructions that when executed by the microprocessor:

determines a measure of confidence of results of the incoming queries;

determines if a measure of confidence is at or above a predetermined threshold; and if the measure of confidence is not at or above the predetermined threshold, generates and transmits a request for human intervention and updates the structured knowledge graph with a response for the human intervention.

11. The apparatus of claim 8, wherein the storage medium further comprises program instructions that when executed by the microprocessor:

receives a query in reference to the structured knowledge graph; and incorporates domain expert knowledge.

12. The apparatus of claim 8, wherein the storage medium further comprises program instructions that when executed by the microprocessor provides data-driven targeting of efforts of a domain expert in curating the structured knowledge graph based on one or more signals indicative of training domain drift.

13. The apparatus of claim 8, wherein the updates to the structured knowledge graph includes at least one of adding nodes, adding connections between nodes, and removing nodes.

14. The apparatus of claim 8, wherein the adaptive component shapes the structured knowledge graph to return a single result for queries.

* * * * *